United States Patent [19]
Albishausen et al.

[11] 3,989,184
[45] Nov. 2, 1976

[54] APPARATUS FOR COLLECTING AND CLASSIFYING A MIXTURE OF SOLID, GASEOUS AND LIQUID CONSTITUENTS

[76] Inventors: Hartmut Albishausen, Auf den 30 Morgen, 6382 Friedrichsdorf; Karl-Ernst Meier-Dörnberg, Schullerstr. 19, 6101 Rossdorf, both of Germany

[22] Filed: June 23, 1975

[21] Appl. No.: 589,066

[52] U.S. Cl. .................................. 233/3; 233/11; 233/20 R; 15/320; 15/340; 15/352
[51] Int. Cl.² .................... B04B 15/08; B04B 1/16; B04B 15/02
[58] Field of Search .................. 233/1 R, DIG. 1, 2, 233/3, 20 R, 27, 28, 32, 19 R, 11, 21; 15/320, 340, 352

[56] References Cited
UNITED STATES PATENTS

| | | | |
|---|---|---|---|
| 2,104,683 | 1/1938 | Rosen et al. | 233/3 X |
| 3,700,849 | 10/1972 | Zuzelo | 15/320 X |
| 3,775,053 | 11/1973 | Wisdom | 15/320 X |
| 3,842,461 | 10/1974 | Wurster | 15/340 |

FOREIGN PATENTS OR APPLICATIONS

| | | | |
|---|---|---|---|
| 224,711 | 3/1943 | Switzerland | 233/27 |

*Primary Examiner*—George H. Krizmanich
*Attorney, Agent, or Firm*—Michael J. Striker

[57] ABSTRACT

A vacuum cleaner wherein a mobile housing contains a tank for a supply of liquid and is connected with a first tube which supplies liquid to a brush serving to scrub and wet a surface to be treated. The brush is further connected with or adjacent to the inlet of a hose which sucks liquid, together with air and solid constituents, into the housing. Coarse solid constituents are segregated by a perforated belt which allows air, liquid and smaller solid particles to enter an upright separating and conveying unit having an air separating device at its lower end, a liquids-solids separating centrifuge in the median portion and a multi-stage compressor at its upper end. Air which is separated from liquid and solid constituents is drawn into the compressor which discharges such air into the atmosphere. The centrifuge has a stator surrounding a hollow rotor which contains a cylinder and a bottom wall defining a compartment which receives clean liquid from above. Solid particles remain in the space below and around the compartment and are evacuated at intervals, preferably in automatic response to reduction of RPM of the motor which drives the compressor. The first tube serves to convey liquid from the compartment to the brush and a second tube connects the compartment with the tank to allow liquid to flow from the tank into the compartment or vice versa. Liquid which flows through the first tube is treated by ultraviolet rays and is heated before it reaches the brush.

39 Claims, 5 Drawing Figures

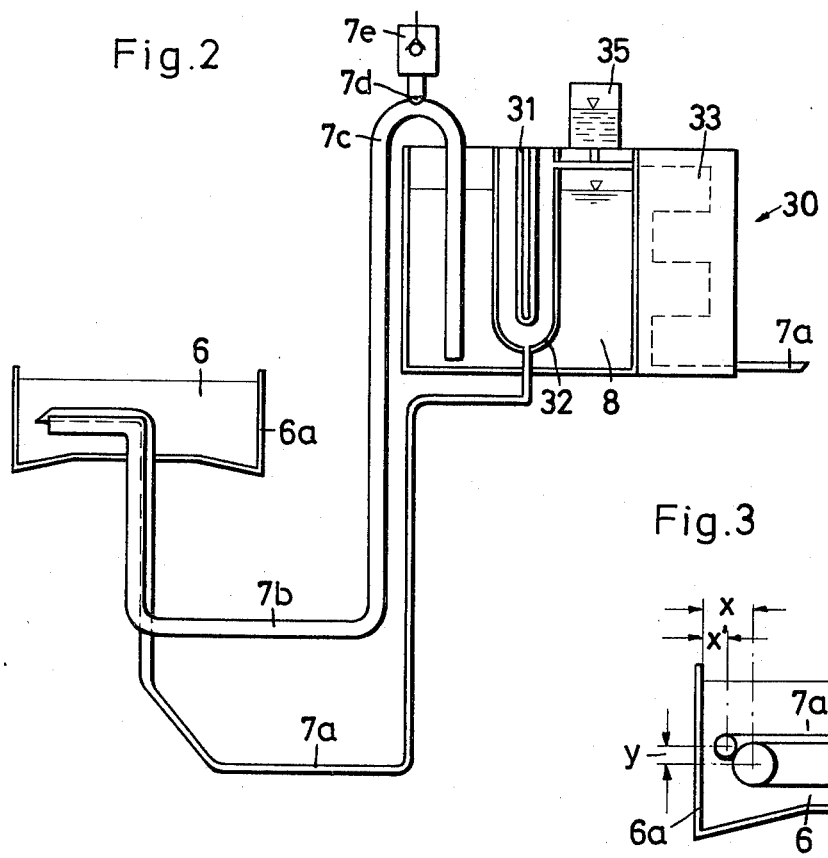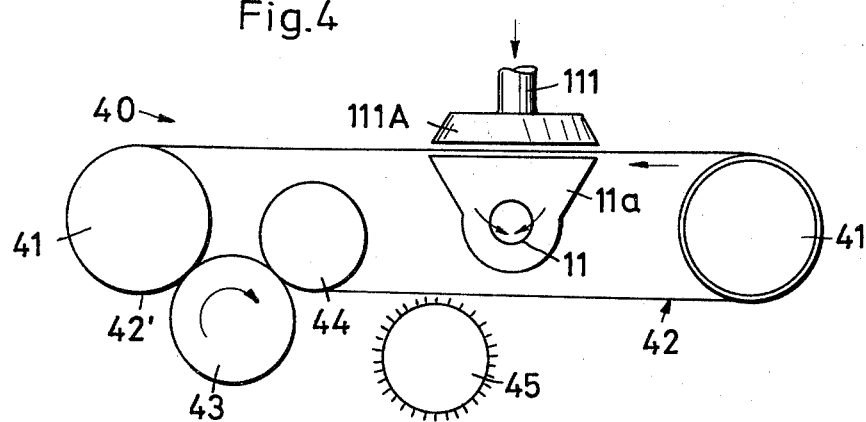

APPARATUS FOR COLLECTING AND CLASSIFYING A MIXTURE OF SOLID, GASEOUS AND LIQUID CONSTITUENTS

BACKGROUND OF THE INVENTION

The present invention relates to cleaning apparatus in general, and more particularly to improvements in vacuum cleaners. Still more particularly, the invention relates to vacuum cleaners of the type wherein a liquid component (preferably a liquid component which contains a detergent and/or a disinfectant) is applied to the surface to be cleaned and is thereupon collected together with solid impurities and air.

German Pat. No. 569,799 discloses an electrical cleaning and sweeping apparatus wherein a vessel is subdivided into two chambers one of which contains a supply of clean liquid and the other of which serves for collection and storage of contaminated liquid. Clean liquid is drawn from the one chamber by a bladed impeller which cooperates with suitable ejector means and feeds a stream of clean liquid to a riser pipe which applies the liquid to the surface to be cleaned (e.g., to the floor). The thus applied liquid is thereupon collected from the surface by suction and is fed into the other chamber of the vessel. The collected liquid contains dust and air, i.e., it is a mixture of solid, liquid and gaseous components. Such apparatus are satisfactory for the cleaning of relatively small areas when a small supply of clean liquid suffices for the application to the surface to be cleaned, namely when the vessel can comprise a relatively small chamber for clean liquid and a relatively small chamber for contaminated liquid. However, the just described apparatus are not suited for largescale cleaning, e.g., of railroad cars, buses and similar vehicles for mass transport of persons. In many instances, the main supply of clean liquid is remote from the locus of use of the cleaning apparatus so that, in order to be capable of treating a large area (e.g., the interior or exterior of an entire coach), the apparatus must carry along large quantities of liquid which contributes to its bulk and energy requirements and limits its utility. Also, the contaminated liquid cannot always be disposed of in immediate vicinity of or close proximity to the surface or surfaces to be cleaned which means that a cleaning apparatus with a large supply of clean liquid must be transported a considerable distance from the main source of supply to the locale of use and a large supply of contaminated liquid must be transported from the locale of use to a disposal area.

SUMMARY OF THE INVENTION

An object of the invention is to provide an apparatus which applies and thereupon removes a liquid component from the surface or surfaces to be treated and is constructed and assembled in such a way that it need not carry a large supply of fresh liquid component but is nevertheless capable of treating large areas without repeated trips to the source of supply of fresh liquid.

Another object of the invention is to provide the apparatus with novel and improved means for regenerating the contaminated liquid component and with novel and with improved means for segregating other constituents from contaminated liquid component.

A further object of the invention is to provide a novel and improved "wet" vacuum cleaner which is not only capable of relieving the contaminated liquid component of solid and/or gaseous constituents but is further capable of treating the thus relieved liquid component with a view to eliminate noxious odors and/or to sterilize the liquid prior to renewed use.

An additional object of the invention is to provide a "wet" vacuum cleaner which, even though especially suited for commercial use, is equally capable of serving as a compact, lightweight, energy-saving and highly effective means for cleaning flat or curved surfaces of floors, windows, furniture, walls or the like in private homes or apartments.

Still another object of the invention is to provide the apparatus with novel and improved means for classifying and collecting solid, liquid and gaseous constituents of a mixture of such constituents in a space-saving manner and with a high degree of efficiency.

Still another object of the invention is to provide the apparatus with novel and improved means for insuring automatically the supply of a liquid constituent (separated from a mixture of solid, liquid and gaseous constituents with a degree of purity permitting the repeated reuse of the liquid constituent with respect to the most cleaning-treatments) to at least one liquid applying head, e.g. brush.

The invention is embodied in an apparatus for classifying a mixture of gaseous, liquid and solid constituents, particularly in a vacuum cleaner. The apparatus comprises a preferably mobile housing or frame and a separating and conveying unit which is mounted in or on the housing and includes a compressor (preferably a multi-state compressor) or an analogous suction generating device, a rotary centrifuge adjacent to and communicating with the suction generating device, and a rotary gas separating device adjacent to and communicating with the centrifuge. The apparatus further comprises a pipe having a mixture-receiving inlet and an outlet communicating with the gas separating device so that the mixture enters the gas separating device as a result of suction produced by the suction generating device whereby the gaseous constituent passes through the centrifuge and enters the suction generating device (which can discharge the gaseous constituent into the surrounding atmosphere) while the liquid and solid constituents enter and are separated from each other in the centrifuge, a receptacle or tank for the liquid constituent, tubular means for establishing a path wherein the liquid constituent can flow between the receptacle and that portion of the centrifuge which contains the separated liquid constituent, and means for evacuating the separated solid constituent from the centrifuge (e.g., first into the outlet and thereupon through a discharge opening of the pipe).

The apparatus may further comprise a separator for coarse solid constituents which is mounted upstream of the inlet of the pipe and/or a processing unit which can treat the liquid constituent in the receptacle or the liquid constituent which is being drawn from the centrifuge and is being conveyed by a second tubular means, e.g., to a brush which applies the liquid constituent to a surface to be treated. The processing unit may comprise means for subjecting the liquid constituent to the action of ultraviolet rays, means for heating the liquid constituent, and/or means which admits to the liquid constituent a detergent, a deodorizing agent, a clarifying agent and/or a disinfectant.

The novel features which are considered as characteristic of the invention are set forth in particular in the appended claims. The improved apparatus itself, however, both as to its construction and its mode of opera-

BRIEF DESCRIPTION OF THE DRAWING

FIG. 2 is a schematic partly elevational and partly sectional view of a portion of a second apparatus;

FIG. 3 illustrates a detail in the structure shown in FIG. 1b or 2; and

FIG. 4 is an enlarged view of the coarse solids separator in the apparatus of FIG. 1.

DESCRIPTION OF THE PREFERRED EMBODIMENTS

Figure 1A:
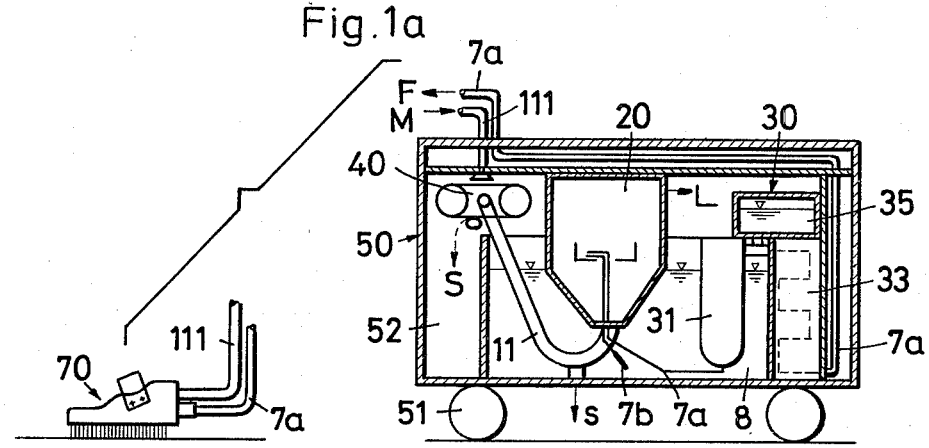
FIG. 1a is schematic vertical sectional view of a mobile cleaning apparatus which embodies the invention and which is coupled with a brush for treating surfaces.
Figure 1B:
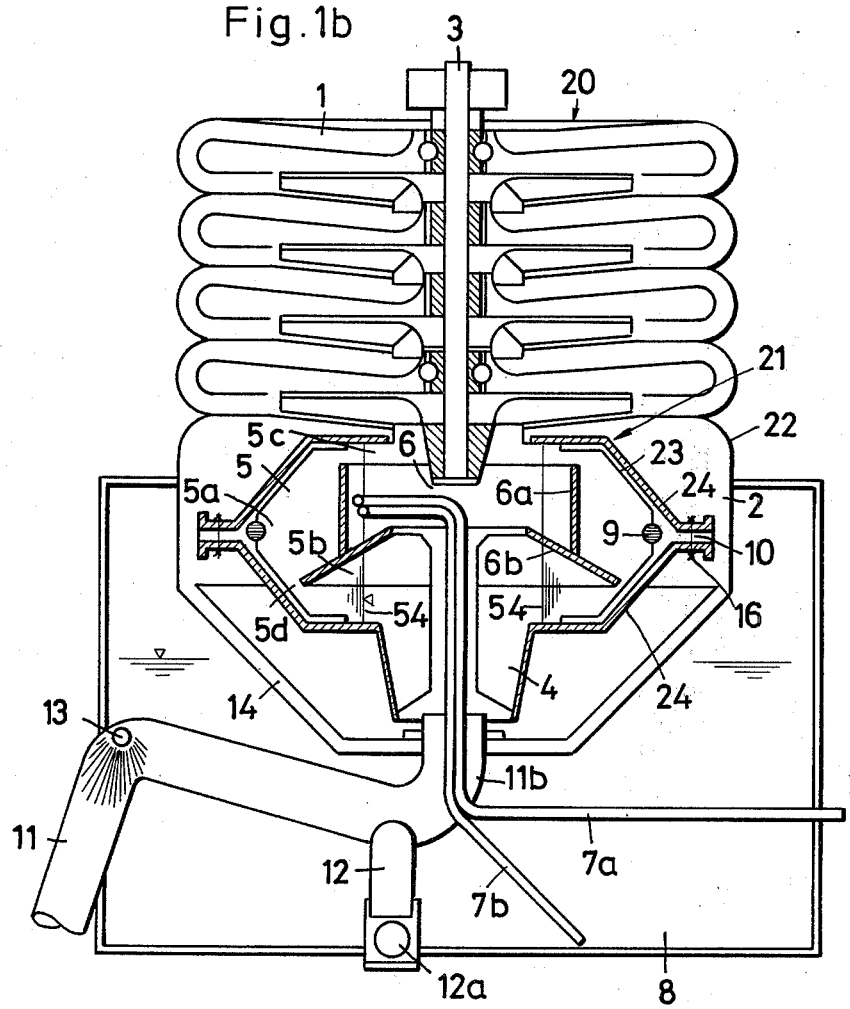
FIG. 1b is enlarged axial sectional view of the separating and conveying unit in the apparatus of FIG. 1.

FIG. 1a shows a mobile cleaning apparatus which comprises a housing or frame 50 mounted on wheels 51 and containing a seaprator 40 for coarse particles S, such as stubs of cigarettes or cigars, a separating and conveying unit 20 and a processing unit 30. The separator 40 comprises an endless sieve or screen 42 (FIG. 4) mounted above a container 52 (FIG. 1) for coarse particles S. Such particles are drawn by suction against the upper reach of the screen 42 in a mixture M of coarse solid particles S, smaller solid particles s, liquid F and air L. That part which supplies the mixture M includes a hose 111 having a nozzle (not shown) which draws the mixture M off the surface to be cleaned by a brush to and an outlet 111A which delivers the mixture onto the upper reach of the screen 42. The screen 42 allows the smaller solid particles s, liquid F and air L to pass therethrough and to enter a funnel 11a at the intake end of a pipe 11 which conveys the mixture of s, F and L into the unit 20. The means for drawing the mixture M into the outlet 111A and for drawing the components s, F and L of the mixture through the upper reach of the screen 42, into the funnel 11a and pipe 11 comprises a multi-stage compressor 1 in the unit 20. The contents of the container 52 can be removed at regular intervals or when necessary, preferably through a sealable outlet in the bottom wall of the housing 50. The smaller solid particles s are removed from the pipe 11, preferably at a locus close to the bottom wall of the housing 50, to enter a suitable tray or the like, not shown. The gaseous component L (air) is discharged into the surrounding atmosphere through an opening located laterally of the compressor 1 in the unit 20. The compressor 1 is mounted in the uppermost portion of the unit 20. The liquid F is separated from air L in the unit 20 and is fed into the processing unit 30 or directly to the surface to be cleaned. There are two paths for the evacuation of liquid F from the unit 20, namely by way of a tube 7a which can be used as a means for applying liquid directly to a surface to be cleaned after the liquid has been treated by an ultraviolet radiator 31 and has passed through a heating device 33 (both forming part of the processing unit 30), or by way of a tube 7b which conveys the liquid into a reservoir or tank 8. As shown in FIG. 1b, a portion of the unit 20 can be installed in the tank 8 to enhance the compactness of the apparatus.

The details of the separating and conveying unit 20 are shown in FIG. 1b. This unit comprises a vertical shaft 3 which is driven by a motor or another prime mover, not shown. Such prime mover can also be used to drive, when necessary, one or more wheels 51 of the housing 50 to facilitate the transport of cleaning apparatus to and from the locale of use. If desired the wheels 51 can be replaced with castors.

The shaft 3 drives the compressor 1 which is disposed immediately above a centrifuge 2 and a rotary separating device 4. The pipe 11 and tubes 7a, 7b project from below into the separating device 4 of the unit 20. The centrifuge 2 constitutes the entry stage of the compressor 1 and the device 4 (which tapers toward the outlet 11b of the pipe 11) serves as a means for admitting a mixture of slid particles s liquid F and air L to the centrifuge. The stator or casing 22 of the centrifuge 2 surrounds a rotor 21 which is driven by the shaft 3 and acts as an impeller (which may or may not operate with a high degree of efficiency) of the entry stage of the compressor. The rotor 21 comprises a star-shaped arrangement of impeller blades 23 and two annular shells 24 which are connected to each other and stressed by screws 16 or analogous fasteners and rotate with the blades 23. The shells 24 have marginal flanges defining an annular gap 10 which can be sealed by an elastic ring-shaped seal 9 under the action of centrifugal force. The just described construction, mounting and configuration of the rotor insures an optimum distribution of stresses and reduction of tangential stresses upon the shells 24 which, in turn, contributes to longer useful life of the rotor and reliable segregation of liquid and solid constituents. Moreover, the manufacturing cost of the rotor 21 is relatively low.

The shells 24 of the rotor 21 define a chamber 5 which contains means for subdividing the interior of the rotor. Such subdividing means defines an annular compartment 6 and includes a hollow cylinder 6a and a wall 6b having a slightly frustoconical marginal portion and an open median portion. The two portions of the wall 6b make an obtuse angle of not substantially less than 180°. The cylinder 6a surrounds the compartment 6 and the wall 6b seals the bottom part of the compartment 6 from the separating device 4. The frustoconical outer portion of the wall 6b defines with the lower shell 24 one or more passages or clearances 5d through which a mixture of liquid and solid components and rise from the device 4 into the annular outer portion 5a of the chamber 5. Analogously, the upper marginal portion of the hollow cylinder 6a defines with the upper shell 24 one or more passages or clearances 5c through which the liquid component can enter the compartment 5. Lighter solid particles accumulate in an annular portion 5b of the chamber 5.

The intake ends of the tubes 7a, 7b extend into the compartment 6. Such intake ends are preferably connected to each other and the intake end of the tube 7a extends radially outwardly beyond the intake end of the tube 7b. The tube 7a transports clean or relatively clean liquid F from the compartment 6 to the point of application of such liquid to a surface to be cleaned. For example, the discharge end of the tube 7a can supply cleaned liquid to one or more brushes which spread liquid over the floor, walls or funiture in a railroad car. The tube 7b supplies liquid from compartment 6 into the tank 8, e.g., into the lowermost portion of the tank 8 below the outlet 11b of the pipe 11. Those portions of the tubes 7a, 7b which are immediately adjacent to and preferably connected with each other extend upwardly and centrally through the outlet 11b of the pipe 11, thereupon centrally through the separating device 4, and radially in the compartment 6. The tube 7a does not communicate with the tank 8.

The outlet 11b of the pipe 11 constitutes an elbow which discharges the mixture of F, L and smaller solid particles upwardly into the separating device 4. The lowermost portion of the elbow or outlet 11b has a downwardly extending tubular discharging portion 12 which contains a normally closed check valve 12a and serves for evacuation of solid particles which are expelled from the chamber 5. The pipe 11 further contains a liquid supplying opening 13 located upstream of the discharging portion 12 and connected to the tube 7a in the interior of the rotor 21.

The lower portion of the stator 22 of the centrifuge 2 tapers conically downwardly toward the pipe 11 and has a horizontal lowermost portion surrounding the outlet 11b. The just mentioned portion of the stator 22 defines a channel 14 whose upper end is located at a level slightly below and radially outwardly of the gap 10. The channel 14 supplies solid particles into the pipe 11; to this end, the outlet 11b of the pipe 11 has openings (not specifically shown) which communicate with the adjacent horizontal portion of the channel 14.

The blades 23 of the rotor 21 are preferably integral with and merge into the separating device 4. This reduces the initial cost and contributes to compactness of the unit 20. The lower portions of blades 23 in the separating device 4 insure rapid and thorough separation of air by agitating the liquid which splashes thereagainst and rises toward the clearance or clearances 5d. The separated gaseous component rises axially of the device 4 and passes axially through the centrifuge toward the lowermost stage of the multi-stage compressor 1 with a minimum of friction and deflection. It can be said that the air separating device 4 is integrated into the centrifuge 2 or vice versa. The axial length of the device 4 depends on the desired air separating effect and on certain other factors, such as the RPM of the shaft 3.

FIG. 2 illustrates a modification wherein the tank 8 is located above the intake ends of the tubes 7a, 7b in the compartment 6. The diameter of the tube 7b exceeds the diameter of the tube 7a and, as mentioned above and shown in FIG. 1b, the discharge end of tube 7b is closely adjacent to the bottom of the tank 8. A median portion of the tube 7b is coaxial or substantially coaxial with the centrifuge 2. The upper side of the tank 8 is open to the atmosphere. The uppermost portion of the tube 7b forms an elbow 7c and contains a preferably sealable opening 7d which can admit air. Such air is being sucked into the tube 7b and insures that liquid cannot flow from the tank 8 back into the compartment 6 due to siphoning effect of the tube 7b when the unit 20 is idle or when the speed of the shaft 3 is reduced. The diameter of the tube 7a is smaller than that of the tube 7b and its intake end extends nearer to the cylinder 6a. The intake end of the tube 7a is bevelled which allows, within limits, for regulation of pressure in the tube 7a. The latter discharges liquid into the lowermost portion of a vessel 32 which surrounds the ultraviolet radiator 31 and is installed in the tank 8. The configuration of the vessel 32 (which can be said to form part of the tube 7a) is such that all of the liquid which flows through the tube 7a is subjected to the action of radiator 31. The upper portion of the vessel 32 communicates with the heater 33 which forms part of the unit 30. The thus heated liquid which flows through the tube 7a is thereupon fed to the aforementioned brush or brushes for application to the surface to be cleaned.

The means for normally sealing the opening 7d may comprise a check valve which is adjusted in such a way that it allows some air to enter the tube 7b but prevents escape of liquid flowing from 6 to 8.

The material of the vessel 32 (which is installed in the tank) preferably permits passage of ultraviolet rays. This insures that the bulk of cleaning liquid in the tank 8 is exposed to such rays. Also, the placing of vessel 32 into the tank 8 contributes to compactness of the apparatus. The intensity of ultraviolet rays in the tank 8 is especially pronounced during those stages of operation when the tube 7a is empty (or the liquid therein is stagnant) and the radiator 31 is on. The height of the radiator 31 and vessel 32 preferably equals or approaches the depth of the tank 8.

The device 33 is preferably a suitable heat exchanger which can be thermally insulated from the tank 8 so that it can rapidly heat the liquid stream in the tube 7a to a desired temperature (e.g., up to 90° C.). However, it is equally within the purview of the invention to install the heating device 33 in the interior of the tank 8, especially if the compactness of apparatus if of primary importance.

FIG. 3 shows one of the presently preferred arrangements of the intake ends of the tubes 7a and 7b. The distance $x$ between the center of opening of the tube 7b in the compartment 6 and the internal surface of the cylinder 6a exceeds the distance $x'$ between such internal surface and the center of opening of the tube 7a. The two intake ends are offset with respect to each other (see $y$), as considered in the axial direction of the cylinder 6a.

The feature that a substantial length of the tube 7a is rigid with the tube 7b contribute to stability of these tubes. Thus, such construction renders it possible to insure that the distance $x$ and $x'$ can be selected with a high degree of accuracy which, in turn, insures that the level 54 of liquid in the compartment 6 influctuates very little or not at all. The aforementioned selection of the distance $y$ and of the inner diameters of tubes 7a, 7b also contributes to highly satisfactory flow conditions in the interior of the cylinder 6.

The details of the separator 40 for coarse solid particles S are shown in FIG. 4. The sieve or screen 42 is trained over two rollers 41 and advances in the direction indicated by arrow. The screen 42 preferably consists of a suitable synthetic plastic material and its upper and lower horizontal reaches are respectively disposed above and below the funnel 11a at the intake end of the pipe 11. The smaller solid particles, liquid and air pass through the upper reach and enter the funnel 11a. The coarse solid particles S are entrained in a direction to the left, as viewed in FIG. 4, and pass over the lefthand roller 41 before descending into the container 52. The right-hand roller 41 is preferably formed with a convex peripheral surface to reduce the likelihood of lateral displacement of the screen. The left-hand roller 41 is adjacent to a motor-driven roll 43 which cooperates with an idler roll 44 and serves to advance the screen 42 toward the right-hand roller 41. A rotary brush 45 removes solid particles from the orifices of the lower reach 42' of the screen 42 and propels the removed particles into the container 52. The driver roll 43 is preferably adjustable so that it can change the tension of the lower reach 42' of the belt 42. This roll bears against the roller 41 as well as against the roll 44 so that the screen is squeezed first during travel through the nip of 41, 43 and again during travel through the nip of 43, 44. Repeated flexing of the lower reach 42' during travel around the roller 41 and thereupon toward the brush 45 contributes to expulsion of coarse solid particles S. The squeezing action of roller 41 and rolls 43, 44 insures that the solid particles which reach the brush 45 are reasonably free of moisture. The brush 45 is preferably adjustable in a direction toward or away from the lower reach 42'.

The parts 41, 42, 44 of the separator 40 can be assembled into a module which is readily removable from and reinsertable into the housing 50. Such modular construction is possible because the brush 45 and driver roll 43 are located outside of the screen 42, i.e., the parts which are driven by the prime mover can remain in the housing 50 while the operator removes the module for the purpose of inspection, repair or replacement with a fresh module.

The operation:

It is assumed that the discharge end of the tube 7a is connected with at least one brush which applies clean liquid to a surface to be treated. The rotating shaft 3 causes the compressor 1 to draw the mixture M from the just mentioned brush or brushes via hose 111 and outlet 111A, through the upper reach of the screen 42 and into the funnel 11a at the intake end of the pipe 11. The apparatus can be used for cleaning of the exterior of a railroad vehicle and especially for the cleaning of compartments in the vehicle, i.e., for the cleaning of walls, carpets, upholstered furniture and the like. The material M which is being sucked into the hose 111 invariably contains air L and normally also contains liquid F and lighter solid particles s as well as at least some coarse or heavier solid particles S. The solid particles may include dust, sand, shreds of tobacco, butts of cigarettes, cigarillos or cigars, remnants of fruits or the like. The mixture of F, L and s enters the separating device 4 from below (via outlet 11b of the pipe 11) and is set in rotary motion because the device 4 rotates with the shaft 3. This results in separation of the gaseous component L which flows upwardly through the central portion of the centrifuge 2 and into the lowermost stage of the multi-stage compressor 1. The last or uppermost stage of the compressor 1 discharges air into the atmosphere.

The solid and liquid components of the mixture which is supplied by the outlet 11b of the pipe 11 flow along the conical internal surface of the separating device 4 and enter the chamber 5 of the centrifuge 2. The solid particles having a low specific weight accumulate in the annular portion 5b of the chamber 5 and the heavier solid particles advance through the clearance or clearances 5d to enter the annular outer portion 5a of the chamber 5. Clean liquid flows through the clearance or clearances 5c into the compartment 6. If the level of such liquid is sufficiently high to reach the intake end of the tube 7a, the latter acts not unlike a pump and draws the liquid from the compartment 6, i.e., from the unit 20. If the rate of inflow of cleaned liquid into the compartment 6 is so high that the tube 7a is incapable of evacuating the liquid at the same rate (this can occur when the rate of flow of liquid from the tube 7a to the brush or brushes is throttled or reduced to zero), the liquid level 54 (as measured radially inwardly from the internal surface of the cylinder 6a) rises toward the axis of the shaft 3 and reaches the intake end of the tube 7b (whose inner diameter is larger than that of the tube 7a) whereby the tube 7b conveys liquid into the tank 8. The just described situation will arise rather infrequently, i.e., it is more likely that the rate at which cleaned liquid flows into the compartment 6 is insufficient to meet the requirement of the brush or brushes which are connected to the discharge end of the tube 7a. This is due to the fact that the hose 111 does not collect all of the liquid which is being supplied by the tube 7a because some of the applied liquid evaporates and some of the applied liquid adheres to the surface or surfaces to be cleaned. Thus, liquid will normally flow from the tank 8, through the tube 7b, into the compartment 6 and into the intake end of the tube 7a. The tube 7b thus insures that the outer portion of the compartment 6 (adjacent to the internal surface of the cylinder 6a) invariably contains a sufficient quantity of liquid to satisfy the requirements of the brush or brushes which are connected with the tube 7a. The tube 7b serves as a means for maintaining the quantity of liquid in the compartment 6 within a predetermined range by conveying surplus liquid into the tank 8 when the requirements of the tube 7a are relatively low and by conveying liquid from the tank 8 into the compartment 6 when the rate of liquid outflow from the compartment 6 via tube 7a exceeds the rate of inflow via clearance or clearances 5c. When the liquid level 54 reaches the intake end of the tube 7b, the latter acts not unlike a pump and conveys liquid into the tank 8. On the other hand, when the liquid level 54 recedes toward the internal surface of the cylinder 6a, suction in the compartment 6 (created by compressor 1) causes liquid to flow from the tank 8 into the compartment 6. The tubes 7a, 7b serve as a simple, reliable, compact and inexpensive substitute for a conventional pump. This is due to the fact that the improved apparatus takes advantage of kinetic energy of liquid F in the rotor 21, of differences between the density of liquid F and gas L, and of suction in the chamber 5 of the centrifuge 2. In addition to such pumping action, the tubes 7a, 7b further perform the function of a two-way liquid level regulator by insuring that the level 54 of liquid in the compartment 6 is invariably within a desirable optimum range, so that the attendant's attention may be directed essentially to the operation of the brushes on the surfaces to be treated.

The liquid which leaves the compartment 5 via tube 7a passes through the processing unit 30 wherein it is subjected to the action of ultraviolet radiator 31 and is thereupon heated by the device 31 before it reaches the liquid applying brush or brushes. In many instances, the liquid which fills or partially fills the tank 8 will contain a disinfectant. Thus, the liquid which is being applied to a surface to be cleaned is capable of destroying bacteria and spores in several ways, namely due to the action of disinfectant which has been added to liquid prior to or by an admixing means 35 during introduction into the tank 8, due to the action of radiator 31, and due to the action of heating device 33. Such multiple bacteria-killing action of the liquid which issues from the apparatus via tube 7a renders it possible to utilize the liquid for treatment of surfaces which are touched by passengers or employees in a railroad car, bus or other conveyance.

When the apparatus is idle, the cylinder 6a in the rotor 21 does not contain a supply of liquid. The operator then starts the prime mover which drives the shaft 3 so that the compressor 1 reduces the pressure in the interior of the rotor 21. This enables the tube 7b to draw fresh liquid from the tank 8 into the compartment 6. Such liquid begins to flow toward the locus of application as soon as the level 54 rises sufficiently to reach the intake end of the tube 7a.

The tank 8 can be rapidly refilled with fresh liquid F by starting the compressor 1 and centrifuge 2, and by thereupon dipping the brush or brushes (i.e., the intake end of the hose 111) into a main supply of fresh liquid so that the hose 111 supplies a stream of air and liquid into the pipe 11 whence the liquid enters the centrifuge 2 and the air escapes into the atmosphere from the last stage of the compressor 1. The tube 7b conveys such liquid from the compartment 6 into the tank 8. The fact that the tube 7a discharges fresh liquid is of no consequence since the brush or brushes at the discharge end of the tube 7a dip into the main supply of fresh liquid. Also, the discharge end of the tube 7b can be sealed.

The heating of liquid in the device 30 (as a rule the temperature of heated liquid will not exceed 90° C.) is of advantage for several reasons. Thus, and as mentioned above, heating promotes the bacteria-killing action of the liquid. Furthermore, a heated liquid is more likely to remove dirt from the surfaces to be cleaned.

The rotor 21 of the centrifuge 2 can be relieved of solids by way of the annular gap 10. The arrangement may be such that, when the shaft 3 is driven at normal operating speed (e.g., in the range of between 8,000 and 12,000 RPM), the elastic seal 9 expands under the action of centrifugal force and seals the gap 10. If the speed is reduced to 3,000–5,000 RPM, the seal 9 contracts and allows solid particles to leave the chamber 5, e.g., subsequent to stoppage of the prime mover when the shaft 3 continues to rotate due to inertia. As the RPM of the shaft 3 decreases, suction in the chamber 5 also decreases so that the check valve 12a in the discharging portion 12 of the outlet 11b opens automatically and enables the liquid to flush sand, dust and other solid particles (which are small enough to pass through the screen 42 of the separator 40) from the stator 22 of the centrifuge 2.

An advantage of the elastic seal 9 is that it allows for rapid and complete evacuation of solid particles from the rotor 21 in spite of the fact that the shells 24 need not be mounted for axial movement relative to each other. Moreover, the attendants need not be concerned with evacuation of solids from the rotor because such evacuation takes place automatically when the RPM of the shaft 3 is reduced sufficiently to permit a contraction of the seal 9.

Another advantage of the rotor 21 is that, even though extremely simple, lightweight and compact, it allows for highly satisfactory segregation of solid and liguid constituents. Thus, the solids accumulate in the annular portions 5a and 5b whereas the liquid rises toward the passes through the clearance or clearances 5c on its way into the compartment 6 in the interior of the cylinder 6a. The central aperture of the lower shell 24 enables liquid and solid constituents to enter the rotor 21, and the central aperture of the upper shell 24 allows the separated gaseous constituent to rise toward and to enter the lowermost stage of the compressor 1.

In order to further enhance the evacuation of solids from the centrifuge 2, the apparatus is designed to allow for repeated flushing of the chamber 5 and of the interior of stator 22. This is rendered possible due to specific relationship between the centrifugal force and suction in the unit 20. Thus, the intervals during which the seal 9 allows material to escape via gap 10 and the intervals during which the valve 12a is open can be selected in such a way that the liquid (containing solid particles) which flows from the gap 10 into the channel 14 and/or the liquid which is sucked into the compartment 6 by tube 7b repeatedly flows into and through the separating device 4 and repeatedly flushes the chamber 5 and the stator 22 (i.e., the channel 14) before the check valve 12a opens. This can take place while shaft 3 rotates at 3,000 to 5,000 RPM.

The screen 42 of the separator 40 may consist of polyamide and may have a mesh of $400\mu$. Such screens are capable of intercepting all coarse solid particles S which are thereupon propelled into the container 52 or pass through the squeezing or demoisturizing assembly including the left-hand roller 41 and rolls 43, 44 of FIG. 4 in order to reduce their moisture content before they enter the range of bristles on the rotating brush 45. As mentioned above, repeated flexing of the lower reach 42' of the screen 42 insures that solid particles which are embedded in the orifices of the screen 42 are loosened and are thereupon readily expelled by the brush 45. If desired, the apparatus may further comprise a nozzle which is located adjacent to the underside of the lower reach 42' downstream of the brush 45 and is mounted behind a transparent pane in the housing 50. The nozzle is connected to a source of liquid (e.g., to the tube 7a) by way of a valve which can be opened when the operator notes that the portions of screen 42 which advance beyond the brush 45 still contain a relatively high percentage of solid particles. The losses in cleaning liquid which are incurred by washing the screen 42 downstream of the brush 45 are and should be relatively small because such liquid is not invariably suited for regeneration and reintroduction into the tank 8. This is due to the fact that coarse solid particles S which are separated by and eventually adhere to the screen 42 include cigarette butts and remnants of cigars. A liquid which remains in long-lasting contact with such particles undergoes undesirable discoloration and acquires noxious taste and smell so that it is not suited for renewed use.

The remainder of the mixture M (i.e., the components s, F and L) which flows in the pipe 11 is conveyed past the liquid supplying opening 13 which can contain an atomizing nozzle serving to discharge liquid supplied by the tube 7a. This is desirable when the mixture M does not contain a liquid component, i.e., the admission of liquid into the pipe 11 (at 13) insures that solid particles which enter the unit 20 can be properly separated from air which is thereupon discharged into the atmosphere. Consequently, solid particles cannot penetrate into the compressor 1 even if the outlet of the tube 7a is sealed or when the rate at which the tube 7a supplies liquid to the brush or brushes is so low that the hose 111 does not collect any liquid or collects liquid in quantities which, in the absense of admission of additional liquid at 13, would enable at least some solid particles to enter to enter the compressor 1. The desirablity of connecting the opening 13 to the compartment 6 or directly to the tank 8 will be readily appreciated by considering that the liquid which is stored in the tank normally contains disinfectants, detergents and other agents; such liquid would be diluted if the opening 13 were to admit clean water. Moreover, connection of the opening to a source of tap water or the like would necessitate the provision of additional piping and/or the placing of a clear water tank into the housing 50.

The processing unit 30 constitutes a desirable and advantageous but optional feature of the improved apparatus. For example, such processing unit can be dispensed with if the apparatus is intended for cleaning of external surfaces on rail-mounted or road vehicles, for the cleaning of patios or sidewalks and analogous purposes. The separator 40 is also desirable but optional, for example, when the apparatus is intended for treatment of surfaces which are reasonably clean and are unlikely to accumulate coarse solid particles. At least the processing unit 30 will be incorporated in the apparatus in combination with the unit 20 when the apparatus is intended for cleaning of surfaces which are likely to be touched by persons. The ingredients of liquid which has been introduced into the tank 8 preferably include substances which enhance the color, taste and odor of the liquid (normally water). The placing of separator 40 ahead of the unit 20 is desirable and advantageous because coarse solid particles S which are segregated from the mixture M by screen 42 are most likely to adversely affect the color, taste and/or odor of the liquid which is being collected by the hose 111. If desired, the apparatus can be provided with a metering device which supplies to the tank 8 a detergent, a deodorant, a clarifying agent and/or a disinfectant at regular or variable intervals.

In its simplest form, the apparatus can comprise a housing or frame 50, a tank 8, a pipe 11, the unit 20, and the tubes 7a, 7b. Such apparatus is surprisingly compact and is capable of treating a large area without necessitating a refilling of tank 8 with fresh liquid. Compactness is particularly desirable when the housing is mounted on wheels and the apparatus is intended to be used in areas which are remote from the main supply of fresh liquid and/or from locations where the operator is permitted to discharge solid and/or liquid waste. The compactness of our improved apparatus is enhanced by the fact that portions 1, 2 and 4 of the unit 20 are coaxial with and are disposed one above the other.

The placing of discharging portion 12 into the lowermost part of the pipe 11 insures the evacuation of solid particles in highly concentrated form. Moreover, the portion 12 renders it possible to evacuate solid particles close to the bottom of the tank 8 or housing 50 so that there is no need for additional piping which would be likely to be clogged by solids. The check valve 12a can be replaced with a removable cap or the like; however, the provision of a check valve which opens when the suction is the pipe 11 decreases is advantageous and desirable because it allows for automatic evacuation of solid particles s as soon as the speed of the shaft 3 is reduced.

Without further analysis, the foregoing will so fully reveal the gist of the present invention that others can, by applying current knowledge, readily adapt it for various applications without omitting features which fairly constitute essential characteristics of the generic and specific aspects of our contribution to the art and, therefore, such adaptations should and are intended to be comprehended without the meaning and range of equivalence of the claims.

What is claimed as new and desired to be protected by Letters Patent is set forth in the appended claims.

We claim:

1. Apparatus for classifying a mixture of solid, liquid and gaseous constituents, particularly a vacuum cleaner, comprising a housing; a separating and conveying unit mounted in said housing and including a suction generating device, a rotary centrifuge adjacent to said device and a rotary gas separating device adjacent to said centrifuge; a pipe having a mixture-receiving inlet and an outlet communicating with said gas separating device so that the mixture enters said gas separating device as a result of suction produced by said suction generating device whereby the gaseous constituent passes through said centrifuge and enters said suction generating device while the liquid and solid constituents are separated from each other in said centrifuge; a receptacle for liquid constituent in said housing; tubular means establishing a path for the flow of liquid constituent between said receptacle and said centrifuge; and means for evacuating the separated solid constituent from said centrifuge.

2. Apparatus as defined in claim 1, wherein said tubular means includes a tube defining a second path for evacuation of liquid component from said centrifuge and said housing.

3. Apparatus as defined in claim 2, wherein said suction generating device comprises a compressor having at least one stage, said centrifuge being in communication with said separating device and said stage so that said compressor draws said mixture from said pipe into said separating device and draws the separated gaseous component from said separating device into said stage via said centrifuge.

4. Apparatus as defined in claim 3, wherein said compressor is coaxial with said centrifuge and said separating device, said centrifuge having a hollow stator and a rotor in said stator, said rotor comprising portions defining a compartment for separated liquid component and said tubular means communicating with said compartment.

5. Apparatus as defined in claim 4, wherein said rotor has a chamber which includes said compartment and further comprises an annular portion which accumulates the separated solid component, said annular portion surrounding said compartment and said evacuating means including an outlet provided in said rotor and means for normally sealing said outlet.

6. Apparatus as defined in claim 5, wherein said evacuating means further comprises channel means provided in said stator and arranged to convey the separated solid constituent from said outlet into said pipe when said sealing means is inoperative, and means for discharging the solid component from said pipe.

7. Apparatus as defined in claim 4, wherein said tubular means further comprises a second tube which defines said first mentioned path, said first mentioned tube having a bevelled liquid-receiving end portion in said compartment.

8. Apparatus as defined in claim 4, wherein said rotor further comprises a set of blades and two annular shells connected to said blades, and evacuating means including an annular gap defined by said shells and surrounding said blades and means for normally sealing said gap, said rotor having a chamber which includes said compartment and further comprises an annular portion surrounding said compartment and communicating with said gap in the inoperative position of said sealing means, said chamber communicating with said separating device to receive the liquid and solid components therefrom whereby the liquid component flows through said annular portion and into said compartment whereas the solid component remains in said annular portion.

9. Apparatus as defined in claim 8, wherein said separating device is integral with said blades.

10. Apparatus as defined in claim 8, wherein said sealing means comprises an elastic ring disposed in said annular portion inwardly of said gap, said ring being expanded by centrifugal force into sealing engagement with said shells when the rotational speed of said rotor exceeds a predetermined speed.

11. Apparatus as defined in claim 4, wherein said rotor has a chamber which includes said compartment and further comprises at least one annular portion surrounding said compartment and communicating with said separating device to receive said solid and liquid components therefrom, said portions of said rotor including a cylinder surrounding said compartment and an annular wall at one end of said cylinder, said rotor further comprising two shells surrounding said annular portion of said chamber, said wall defining with one of said shells a first clearance for admission of solid and liquid components into said annular portion and said cylinder defining with the other of said shells a second clearance for admission of liquid component from said annular portion into said compartment.

12. Apparatus as defined in claim 4, wherein said evacuating means comprises channel means provided in said stator and arranged to feed the separated solid component into said pipe, and means for discharging the solid component from said pipe.

13. Apparatus as defined in claim 12, wherein said discharging means comprises a normally closed check valve in said pipe.

14. Apparatus as defined in claim 1, further comprising means for supplying liquid component into said pipe intermediate said inlet and outlet thereof.

15. Apparatus as defined in claim 14, wherein said supplying means is connected with said tubular means.

16. Apparatus as defined in claim 1, wherein said centrifuge has a rotor defining a compartment for separated liquid component, said rotor including a cylinder surrounding said compartment and having an internal surface along which the separated liquid accumulates when said rotor is driven, said tubular means comprising a first tube which defines said first mentioned path and a second tube which defines a second path for removal of liquid component from said compartment and said housing, said tubes having open ends located in said compartment and the open end of said second tube being nearer to said internal surface than the open end of said first tube.

17. Apparatus as defined in claim 16, wherein the inner diameter of said first tube exceeds the inner diameter of said second tube.

18. Apparatus as defined in claim 16, wherein said first tube has a portion located at a level above said compartment and said receptacle and an air-admitting opening in said portion.

19. Apparatus as defined in claim 18, further comprising a check valve in said opening.

20. Apparatus as defined in claim 16, wherein said tubes have portions which are rigidly connected to each other.

21. Apparatus as defined in claim 16, wherein said open ends of said tubes are offset with respect to each other, as considered in the axial direction of said cylinder.

22. Apparatus as defined in claim 1, wherein said centrifuge comprises a stator and a rotor in said stator, said evacuating means comprising a channel provided in said stator.

23. Apparatus as defined in claim 1, wherein at least a portion of said unit extends into said receptacle.

24. Apparatus as defined in claim 1, wherein said tubular means comprises a first tube which defines said first mentioned path and a second tube which defines a second path for removal of liquid component from said centrifuge, and further comprising means for processing the liquid component in said second path.

25. Apparatus as defined in claim 24, wherein said processing means comprises means for admixing a disinfectant to the liquid component in said housing.

26. Apparatus as defined in claim 24, wherein a portion of said second tube constitutes a vessel and said processing unit comprises an ultraviolet radiator in said vessel.

27. Apparatus as defined in claim 26, wherein said portion of said second tube consists of a material which is permeable to ultraviolet rays and is installed in said receptacle.

28. Apparatus as defined in claim 27, wherein said receptacle has a predetermined height and said vessel is an upright vessel having a height which approximates said predetermined height.

29. Apparatus as defined in claim 24, wherein said processing means comprises a heater for the liquid component in said second path.

30. Apparatus as defined in claim 29, wherein said processing means further comprises an ultraviolet radiator disposed in said second path upstream of said heater.

31. Apparatus as defined in claim 1, wherein said solid component includes coarse and smaller solid particles, and further comprising a separator installed in said housing and having means for segregating said coarse particles from said mixture upstream of said inlet of said pipe.

32. Apparatus as defined in claim 31, wherein said segregating means comprises a plurality of rollers, an endless screen trained over said rollers, and means for moving said screen, said screen having an elongated portion and said inlet of said pipe being adjacent to one side of said portion, and further comprising means for conveying said mixture against the other side of said elongated portion opposite said inlet, said screen having orifices large enough to permit passage of liquid and gaseous components and said smaller particles but too small to permit passage of said coarse particles.

33. Apparatus as defined in claim 32, wherein one of said rollers has a convex peripheral surface.

34. Apparatus as defined in claim 32, wherein said screen consists of synthetic plastic material.

35. Apparatus as defined in claim 32, wherein said screen comprises a second elongated portion and said means for moving said screen comprises a driven roll outwardly adjacent to and engaging said second elongated portion, said separator further comprising a second roll engaging said second elongated portion opposite said driven roll.

36. Apparatus as defined in claim 35, further comprising means for cleaning said second elongated portion downstream of said rolls.

37. Apparatus as defined in claim 36, wherein said cleaning means comprises a rotary brush.

38. Apparatus as defined in claim 36, wherein said separator further comprises means for collecting said coarse particles.

39. Apparatus as defined in claim 36, wherein said rolls cooperate with one of said rollers and with each other to repeatedly flex and expel moisture from successive increments of said screen.

* * * * *